United States Patent
Trunck et al.

[11] Patent Number: 5,883,338
[45] Date of Patent: Mar. 16, 1999

[54] TELEMENTRY BY DIGITIZER STYLUS

[75] Inventors: Bruce R. Trunck, Monument; Steven K. Skoog, Colorado Springs, both of Colo.

[73] Assignee: Hyundai Electronics America, Inc., San Jose, Calif.

[21] Appl. No.: 906,254

[22] Filed: Aug. 4, 1997

Related U.S. Application Data

[63] Continuation of Ser. No. 358,213, Dec. 16, 1994.

[51] Int. Cl.$^6$ .................................................. G08L 21/00
[52] U.S. Cl. ..................................... 178/19.07; 178/19.01
[58] Field of Search ....................... D78/18–20; 345/156, 345/163, 174, 175, 179, 180; 282/187, 313, 314, 315; 178/19.07, 19.06, 19.03, 18.01

[56] References Cited

U.S. PATENT DOCUMENTS

| | | | |
|---|---|---|---|
| 4,650,926 | 3/1987 | Nakamura et al. | 178/18 |
| 4,672,154 | 6/1987 | Rodgers et al. | 178/19 |
| 4,814,552 | 3/1989 | Stefik et al. | 178/18 |
| 4,831,566 | 5/1989 | Matthews et al. | 364/571.05 |
| 4,853,493 | 8/1989 | Schlosser et al. | 178/18 |
| 5,004,872 | 4/1991 | Lesley | 178/18 |
| 5,054,088 | 10/1991 | Gunderson et al. | 382/3 |
| 5,115,107 | 5/1992 | Crooks et al. | 178/18 |
| 5,136,125 | 8/1992 | Russell | 178/19 |
| 5,138,118 | 8/1992 | Russell | 178/19 |
| 5,150,420 | 9/1992 | Haraguchi | 382/3 |
| 5,218,174 | 6/1993 | Gray et al. | 178/19 |
| 5,223,677 | 6/1993 | Kapp et al. | 178/18 |
| 5,225,636 | 7/1993 | Protheroe | 178/18 |
| 5,227,590 | 7/1993 | Protheroe et al. | 178/18 |
| 5,227,622 | 7/1993 | Suzuki | 250/221 |
| 5,239,489 | 8/1993 | Russell | 364/560 |
| 5,241,303 | 8/1993 | Register et al. | 340/706 |
| 5,245,139 | 9/1993 | Protheroe et al. | 178/18 |
| 5,247,137 | 9/1993 | Epperson | 178/18 |
| 5,247,138 | 9/1993 | Landmeier | 178/19 |
| 5,285,506 | 2/1994 | Crooks et al. | 382/13 |
| 5,287,417 | 2/1994 | Eller et al. | 382/41 |
| 5,294,792 | 3/1994 | Lewis et al. | 345/163 |
| 5,321,584 | 6/1994 | Matheny | 361/752 |
| 5,349,139 | 9/1994 | Verrier et al. | 178/19 |
| 5,373,118 | 12/1994 | Watson | 178/18 |
| 5,414,227 | 5/1995 | Schubert et al. | 178/18 |
| 5,434,371 | 7/1995 | Brooty | 178/18 |
| 5,454,046 | 9/1995 | Carman, II | 382/186 |
| 5,478,976 | 12/1995 | Kano | 178/19 |
| 5,501,535 | 3/1996 | Hastings et al. | 400/88 |
| 5,517,579 | 5/1996 | Baron et al. | 382/187 |
| 5,525,981 | 6/1996 | Abernethy | 178/18 |
| 5,557,076 | 9/1996 | Wieczorek et al. | 178/19 |
| 5,581,783 | 12/1996 | Ohashi | 395/825 |
| 5,612,720 | 3/1997 | Ito et al. | 345/179 |

FOREIGN PATENT DOCUMENTS

| | | | |
|---|---|---|---|
| 9418663 | 8/1994 | European Pat. Off. | G09G 3/02 |
| 0615209 | 9/1994 | European Pat. Off. . | |
| 0622724 | 11/1994 | European Pat. Off. . | |

*Primary Examiner*—Paul Loomis
*Attorney, Agent, or Firm*—Townsend and Townsend and Crew LLP

[57] ABSTRACT

The invention concerns a stylus for use with a digitizing tablet, such as that associated with the display of a portable computer. The stylus contains memory which stores data such as operating state (i.e., states of user-controlled buttons, state of charge of battery), a stylus identification code, and fault codes, which indicate error conditions which arise. The invention transmits the contents of memory, by a serial bit stream, to the computer.

18 Claims, 8 Drawing Sheets

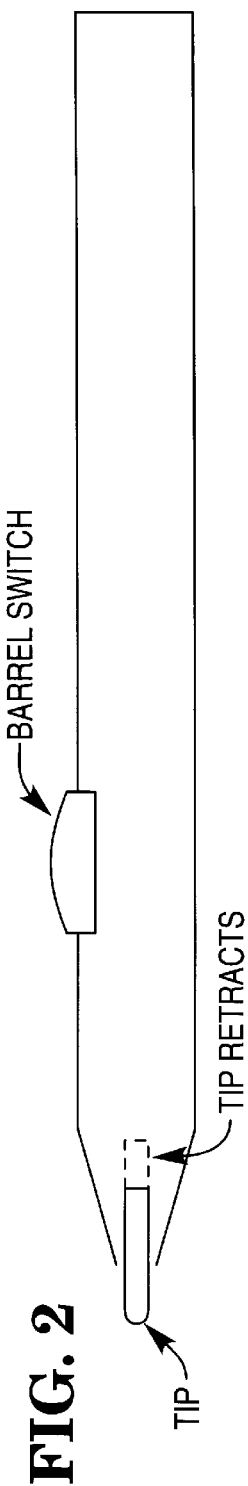
FIG. 2
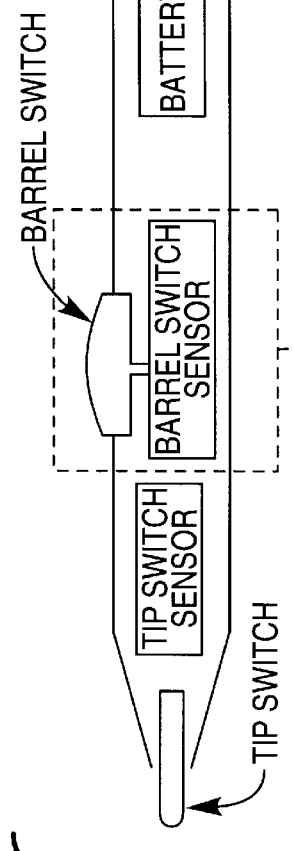
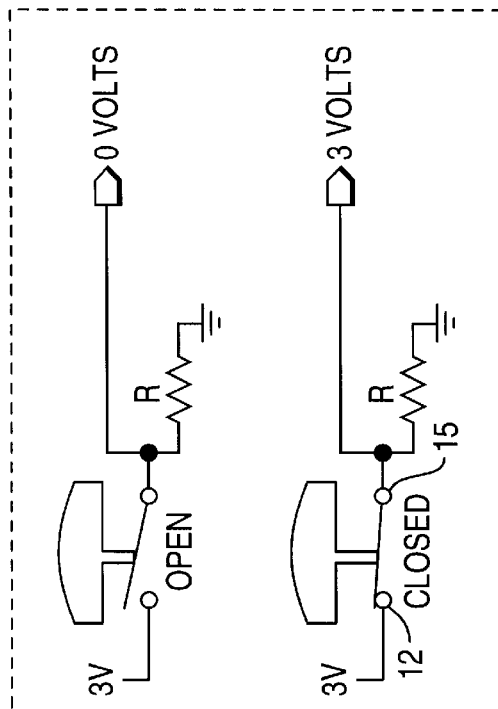
FIG. 3

TELEMENTRY BY DIGITIZER STYLUS

This is a continuation of application Ser. No. 08/358,213 filed on Dec. 16, 1994.

CROSS REFERENCE TO RELATED APPLICATION

The present invention is related to commonly assigned and co-pending U.S. application entitled, "Digitizer Stylus Containing Handwriting Data", invented by Skoog, and having a docket number of 6053, filed concurrently herewith on Dec. 16, 1994, and hereby incorporated by reference.

The invention concerns the transmission of information from a stylus, used with a digitizing tablet, to a system which processes the information.

BACKGROUND OF THE INVENTION

Pen-based portable computers contain digitizing tablets, usually coinciding with the computer's display, by which a user enters information, using a stylus. The stylus transmits a position signal, by which the computer ascertains the position of the stylus.

In addition to transmission of a position signal, the present invention transmits other data indicative of operating conditions of the stylus.

OBJECTS OF THE INVENTION

An object of the invention is to provide an improved stylus for use with a digitizing tablet.

Another object of the invention is to provide a stylus which contains memory, and which transmits the contents of its memory to a receiver.

SUMMARY OF THE INVENTION

In one form of the invention, a stylus, of the type commonly used in pen-based computers, contains memory which stores information such as battery condition or a serial number of the stylus. The stylus reads the memory, and telemeters the memory contents to its associated computer.

BRIEF DESCRIPTION OF THE DRAWINGS

FIG. 2 is a more detailed schematic of the stylus.

FIG. 3 illustrates several components contained within the stylus.

FIG. 10a illustrates one use of the present invention with a computer network; and FIG. 10b is a flow diagram of a method of use of the present invention with the computer network of FIG. 10a.

DETAILED DESCRIPTION OF THE INVENTION

Figure 1:
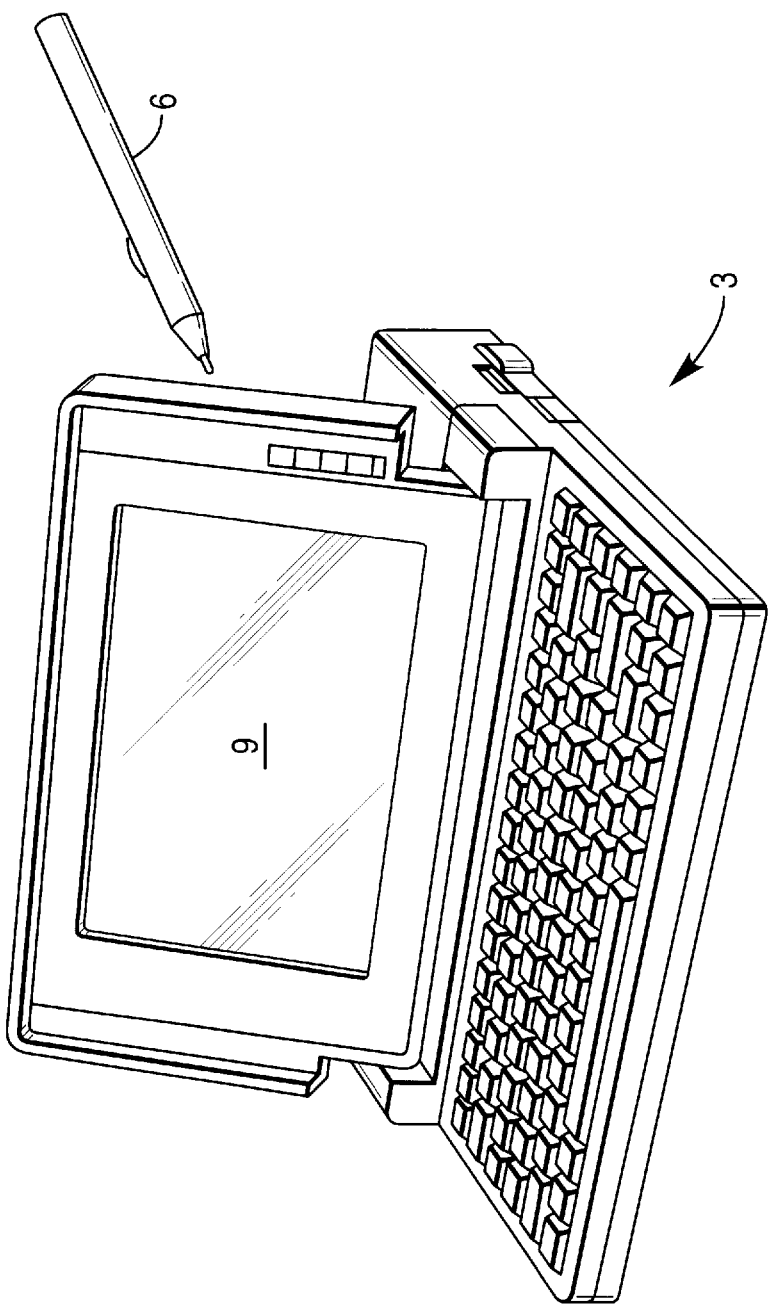
FIG. 1 illustrates a portable computer and a stylus.

FIG. 1 illustrates a portable computer 3 and a cordless stylus 6. An operator of the computer uses the stylus to draw or write upon the display 9, as though the stylus were a pencil. The stylus transmits signals by which the computer can ascertain the position of the stylus.

Data is Stored in Registers in Stylus

FIG. 2 is a schematic which shows greater detail of the stylus. The stylus contains registers which store data. Three types of data are the following.

One type indicates status of a BARREL SWITCH, located on the barrel of the stylus. When this switch is depressed, a sensor, such as that indicated in FIG. 3, detects the depression. In the sensor, two switch contacts 12 and 15 are forced together, pulling one end of the resistor R to 3 volts, thus issuing the three-volt signal indicated.

Another type indicates the status of a TIP SWITCH. When the user presses the stylus against the display 9, the TIP is forced to retract. The retracted position is indicated in FIG. 2. A sensor, perhaps similar to that shown in FIG. 3, detects the retraction, and issues a signal.

Figure 4:
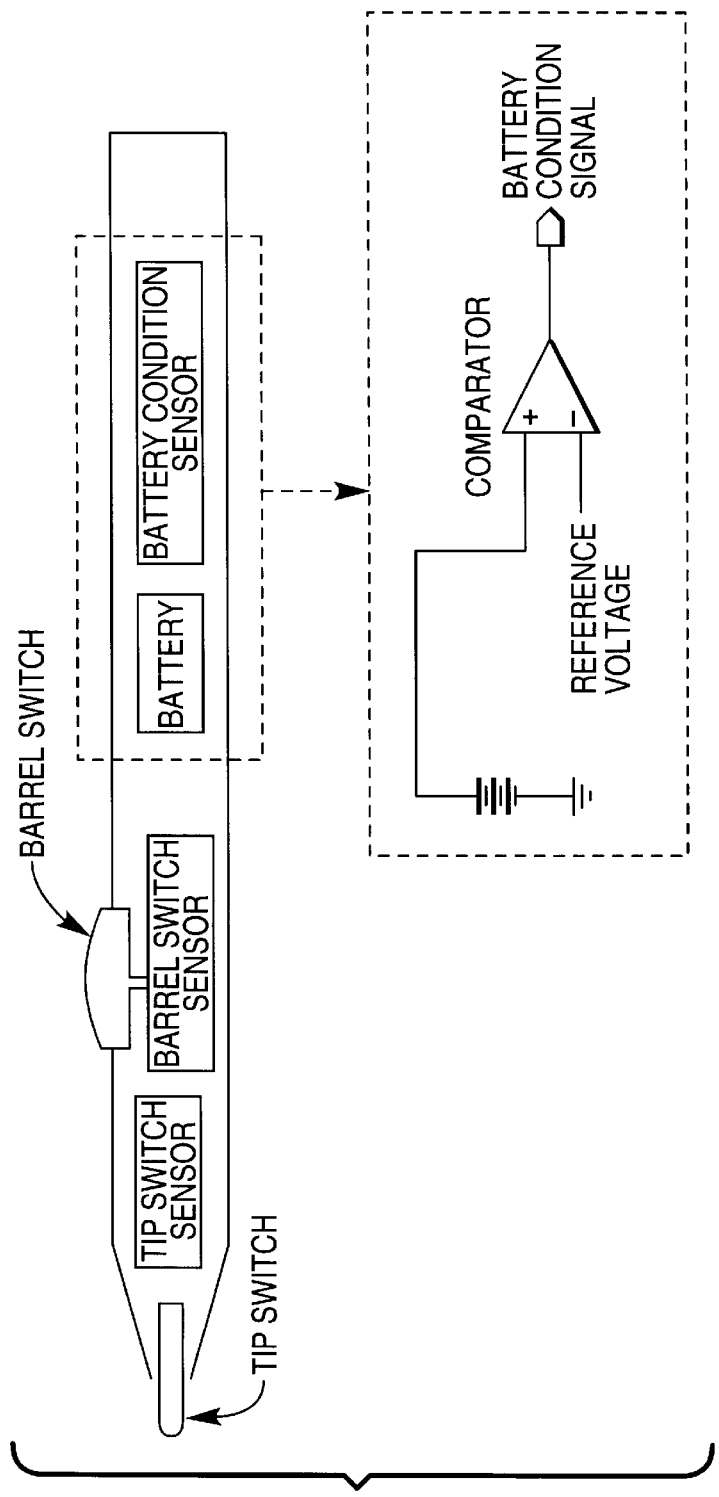
FIG. 4 illustrates apparatus for sensing condition of the battery within the stylus.

A third type indicates battery condition. The stylus is powered by one or more electrical batteries. A BATTERY is shown in FIG. 4. The stylus contains a COMPARATOR, which compares the battery voltage with a REFERENCE VOLTAGE. When the former falls below the latter, the output of the COMPARATOR switches state, thereby producing a BATTERY CONDITION SIGNAL.

Figure 5:
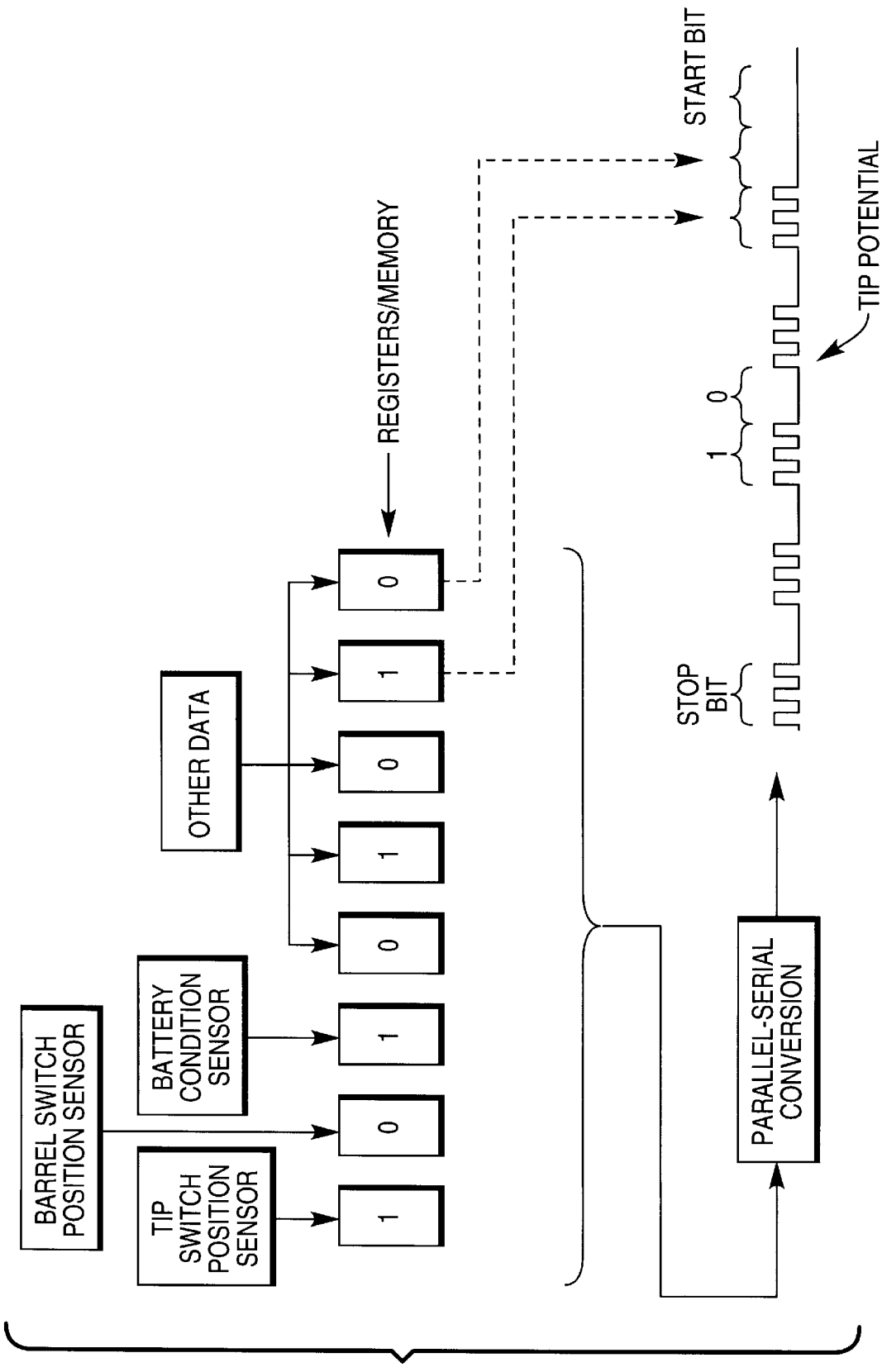
FIG. 5 illustrates parallel-to-serial conversion of data stored within the stylus.

Three stylus signals have been discussed, namely, tip switch status, barrel switch status, and battery condition. The sensors producing these signals feed REGISTERs, or memory, which hold them, as shown in FIG. 5. (Registers are not necessarily required in all cases. For example, if a signal is produced by a switch closure, as in FIG. 3, the closed switch itself acts as a register.) Other types of data, discussed later, can also be held in other REGISTERs, as indicated in FIG. 5 by the block OTHER DATA.

Convert Register Data to Serial Bit Stream

The block PARALLEL-SERIAL CONVERSION reads each register and produces a serial bit stream based on the registers, as indicated. For example, the right-most bit, the ZERO labeled OTHER DATA, corresponds to the ZERO in the serial stream which is adjacent the START BIT, as indicated by the dashed arrow.

Figure 6:
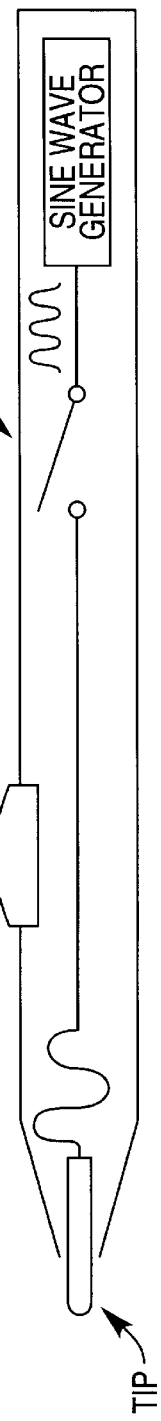
FIG. 6 illustrates apparatus for generation of a carrier, which is amplitude-modulated, in order to carry the serial data of FIG. 5.

The bit stream is a pulse train which is amplitude-modulated. The pulse train can be viewed as produced by a SINE WAVE GENERATOR shown in FIG. 6. When a logic ONE is to be produced, the switch SW is closed, thereby connecting the SINE WAVE GENERATOR to the TIP, thereby producing a ONE signal. A ONE signal is indicated in the serial bit stream of FIG. 5.

The TIP is capacitively coupled to the display when in close proximity to the display 9 in FIG. 1. The ONE signal is thus detected when the TIP contacts or is close to the display.

In FIG. 5, a START BIT, value ZERO, indicates the start of a serial bit stream. A STOP BIT, value ONE, indicates the termination of a serial bit stream. The serial bit stream is preferably eight bits long, and contains one bit for each of the registers shown in FIG. 5.

In addition, other overhead bits are transmitted, along with the information packet of eight bits. These are used for such matters as error-correction.

Apparatus for (a) producing a serial bit stream, based on the data stored in the REGISTERs, (b) inserting the START and STOP codes, and (c) producing error-correcting codes are known in the art.

Therefore, one form of the invention has been discussed, wherein a stylus stores single-bit pieces of information. The invention transmits these bits, serial fashion, by amplitude-modulating a sine wave train, and applying this wave train to the TIP of the stylus.

Alternate Form of the Invention

The data stored within the stylus is not limited to single-bit information. For example, the TIP SWITCH can be replaced by a pressure transducer, which produces an analog voltage, based on the downward pressure applied to the TIP when a user presses the stylus against the display 9 in FIG. 1.

The analog voltage can be converted to digital form, via analog-to-digital conversion, thus producing a multi-bit word indicative of tip switch position. This word can be stored in a REGISTER, as shown in FIG. 7, which is associated with the block TIP SWITCH POSITION SENSOR, which produces the word.

Similarly, multi-bit words can be generated indicative of BARREL SWITCH position, and battery voltage, as indicated.

These multi-bit words are converted into packets of serial bits, again by amplitude-modulating a carrier, and applying the carrier to the TIP. Another piece of data is transmitted in addition to the data described in the single-bit case, namely, an identifier for the data in the packet. FIG. 7 indicates a three-bit identifier, which allows eight possible types of data to be identified.

Figure 7:
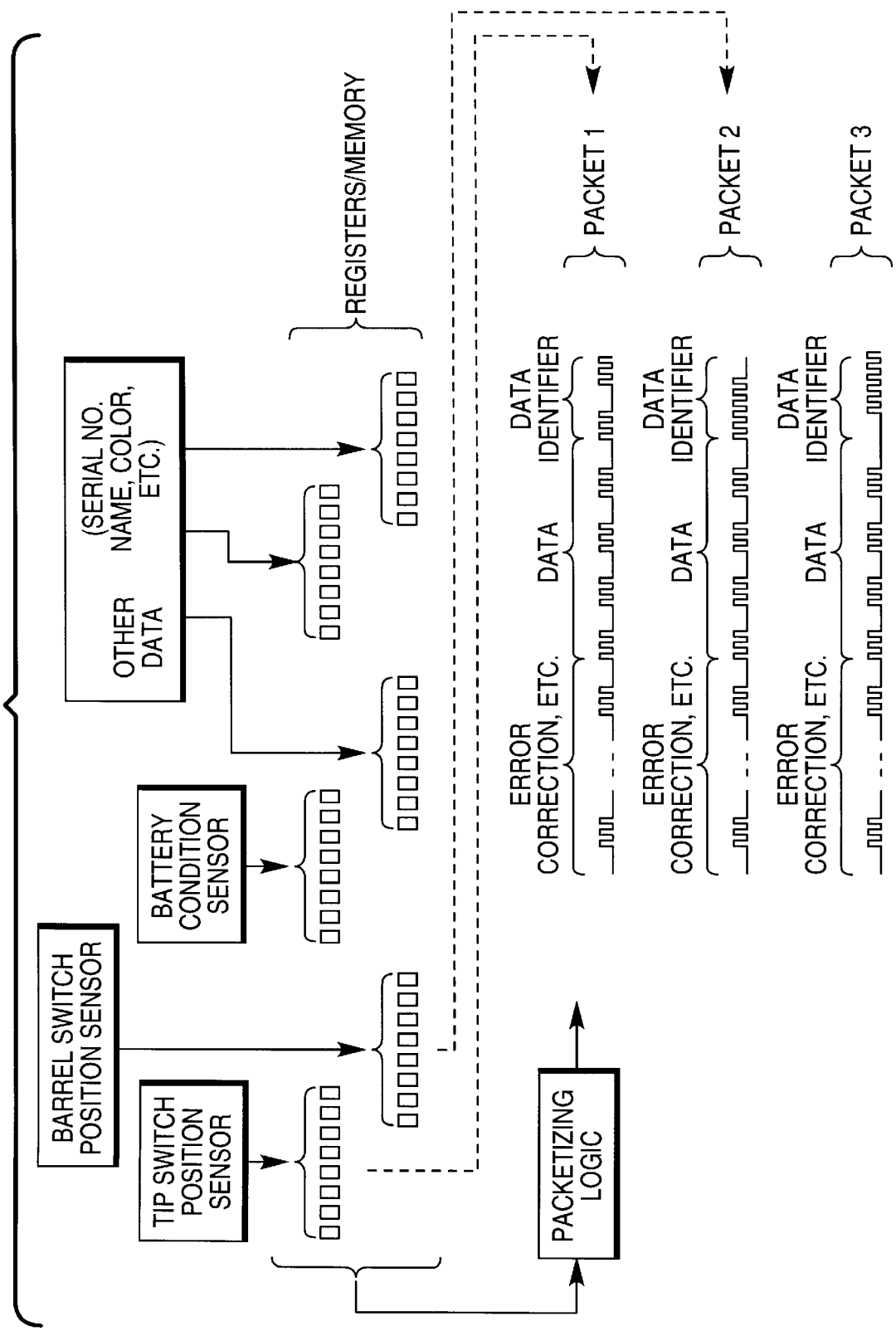
FIG. 7 illustrates storage of multiple-bit words within the stylus, and generation of serial data packets for each word.
Figure 8:
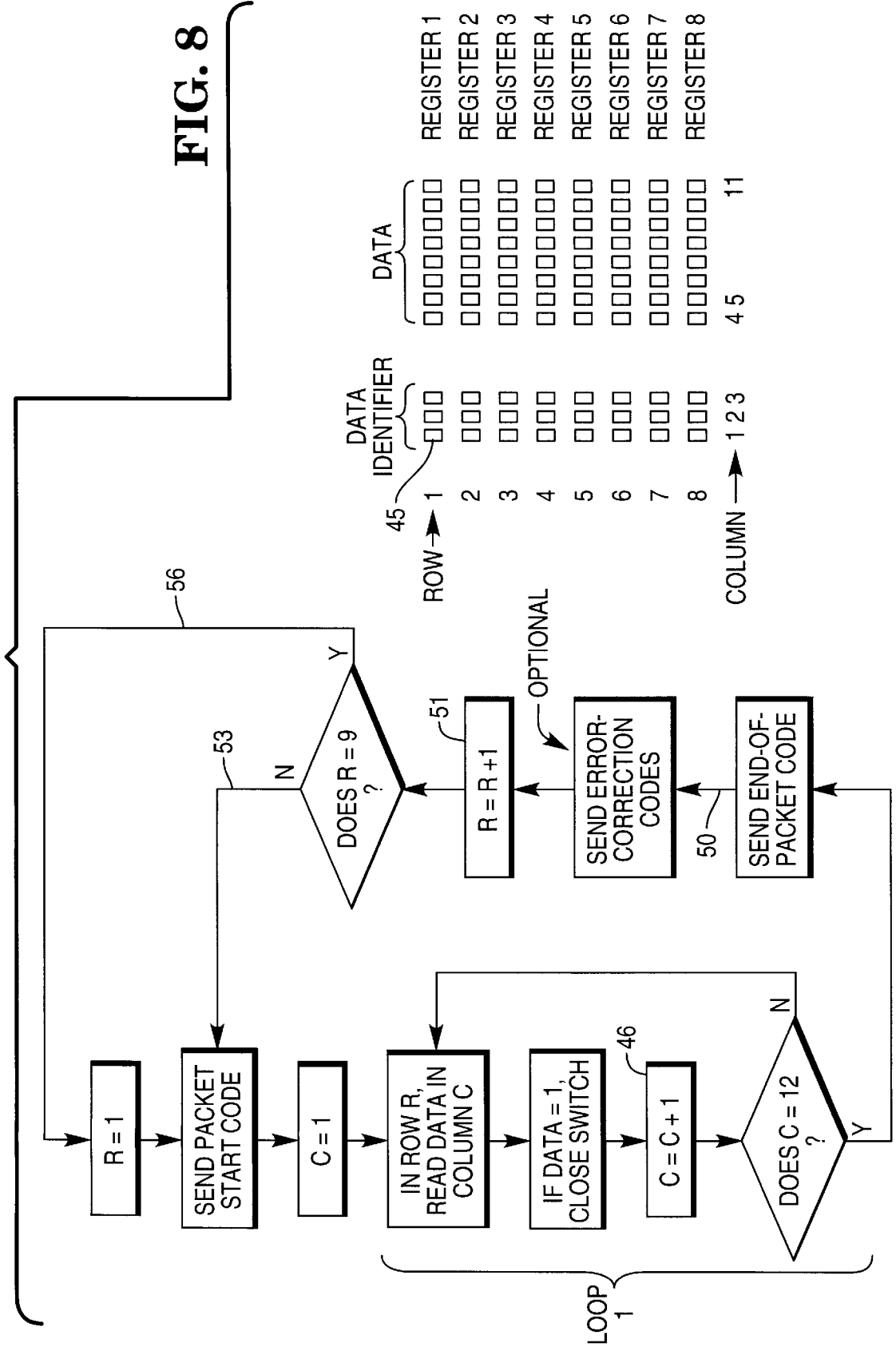
FIG. 8 illustrates logic for generating serial packets from the words stored in memory.

A schematic of one type of logic which implements the function indicated by the PACKETIZING LOGIC block in FIG. 7 is given in FIG. 8. This logic can be implemented in numerous different ways, including software running on a microprocessor, or in dedicated hardware.

The registers, together with their DATA IDENTIFIERs, can be conceptualized as arranged in ROWs and COLUMNs, as indicated. The logic continually cycles. It reads every bit, left-to-right, row-by-row. Each bit, as it is read, is inserted into the serial bit stream.

As an example, assume that the logic presently reads the data at ROW 1, COLUMN 1, namely, bit 45. If the data is a ONE, the logic closes the switch SW, shown in FIG. 6, causing the pulse train to be connected to the TIP. That is, a ONE, as shown in FIG. 5, is generated in the serial bit stream.

If the data is a ZERO, no action is taken, causing a ZERO, as shown in FIG. 5, to be generated.

Then a column index, C, is incremented, by block 46 in FIG. 8, causing the next column to be read, and a ONE or ZERO to be generated for each, until the last column is read.

After the last column is read, the logic takes branch 50, which causes an END-OF-PACKET code, such as 1111, to be sent. A row index, R, is then incremented in block 51, and the next row is read, column-by-column, by taking branch 53. If the last row, ROW 8, has just been read, then branch 56 is taken, and the process repeats, starting at ROW 1, COLUMN 1, because both R and C are now re-set to 1.

The invention continually cycles through the REGISTERs, reading each and transmitting the following continuous serial stream:
[DATA IDENTIFIER, then DATA], [DATA IDENTIFIER, then DATA], etc.

If desired, error correction codes can be inserted between each pair of DATA and DATA IDENTIFIER.

Observations

It should be observed that it is possible to make the end-of-packet code identical with the start-of-packet code, because the start of one packet coincides with the end of another. In this case, block 59 in FIG. 8 can be eliminated. This code can be more generically referred to a packet demarcation code.

It should also be observed that the DATA IDENTIFIER can be treated as an identifier of the REGISTER storing the DATA.

Other Types of Data

The OTHER DATA of FIG. 7 can include the following.

1. The name of the owner of the stylus. With reference to FIGS. 10a and 10b, the computer can be programmed with the preferences of the owner, such as preferred display colors. The computer automatically conforms to the programmed preferences when it reads the name of the owner.

Also, the computer can be programmed to allow access to certain files to only specified individuals. The name of the owner thus indicates access rights.

Figure 10:
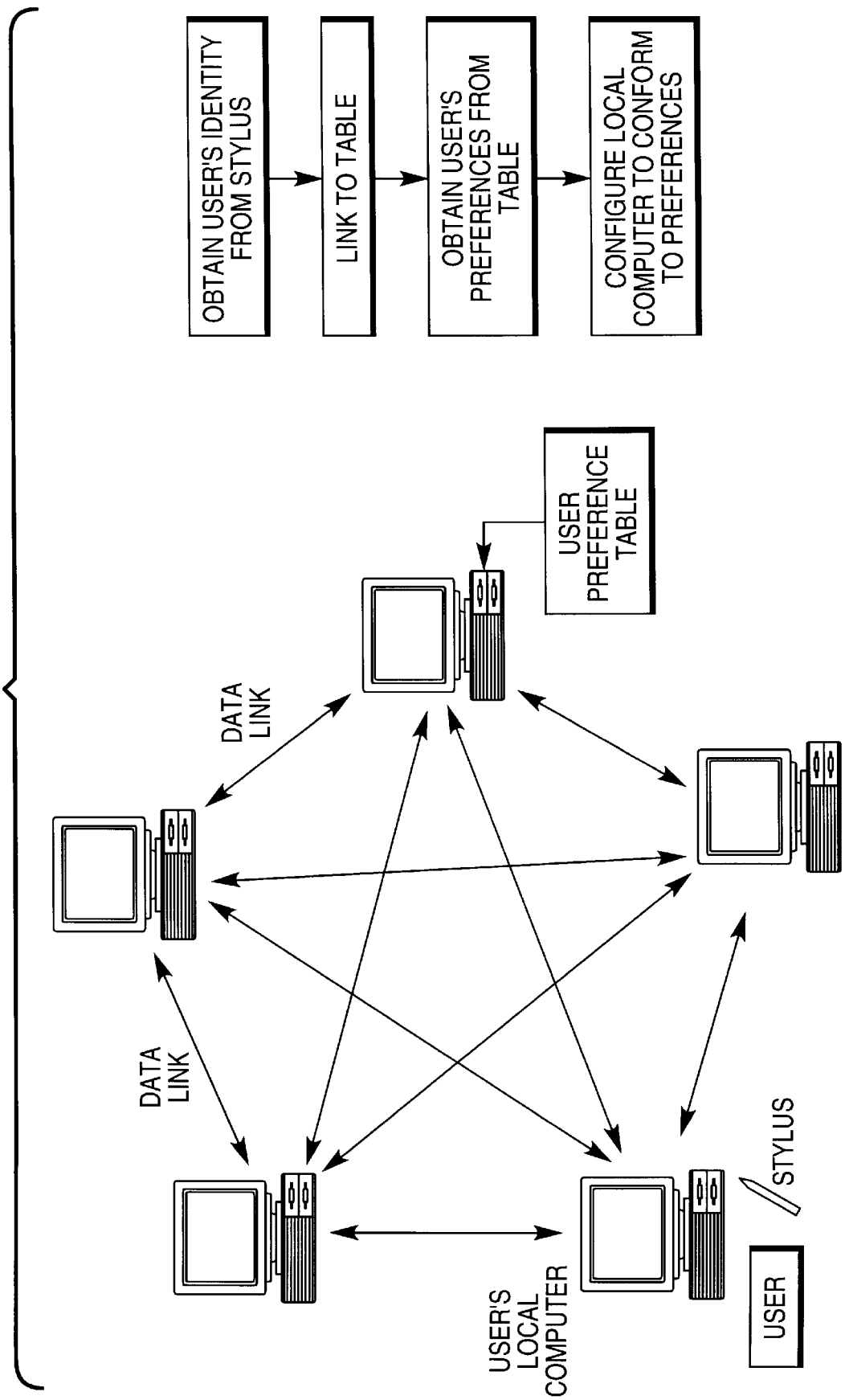
FIGS. 10(A/B) illustrate a configuration of computers that can be used with the stylus of the present invention.

Referrng to FIG. 10, a plurality of computers are shown connected by data links. One computer has an associated user reference table. Another computer is signified as a user's local computer. As shown, a user and a stylus are associated with the local computer.

As illustrated by the flow chart in FIG. 10, the user's identity is obtained from the stylus. Next, a link is made to the user preference table. The user's preferences are obtained from the user preference table. Finally, the local computer is configured to conform to the preferences.

2. A serial number of the stylus. The serial number can be useful in tracking lost or stolen styli. Also, the serial number can be useful when a stylus is to be repaired, as under a warranty contract. The serial number allows a service technician to maintain a separate, external, record of warranty work done on the stylus.

3. A color of the stylus. When the stylus transmits its color code, the computer draws a line in the corresponding color, if the computer is equipped with a color display.

Figure 9:
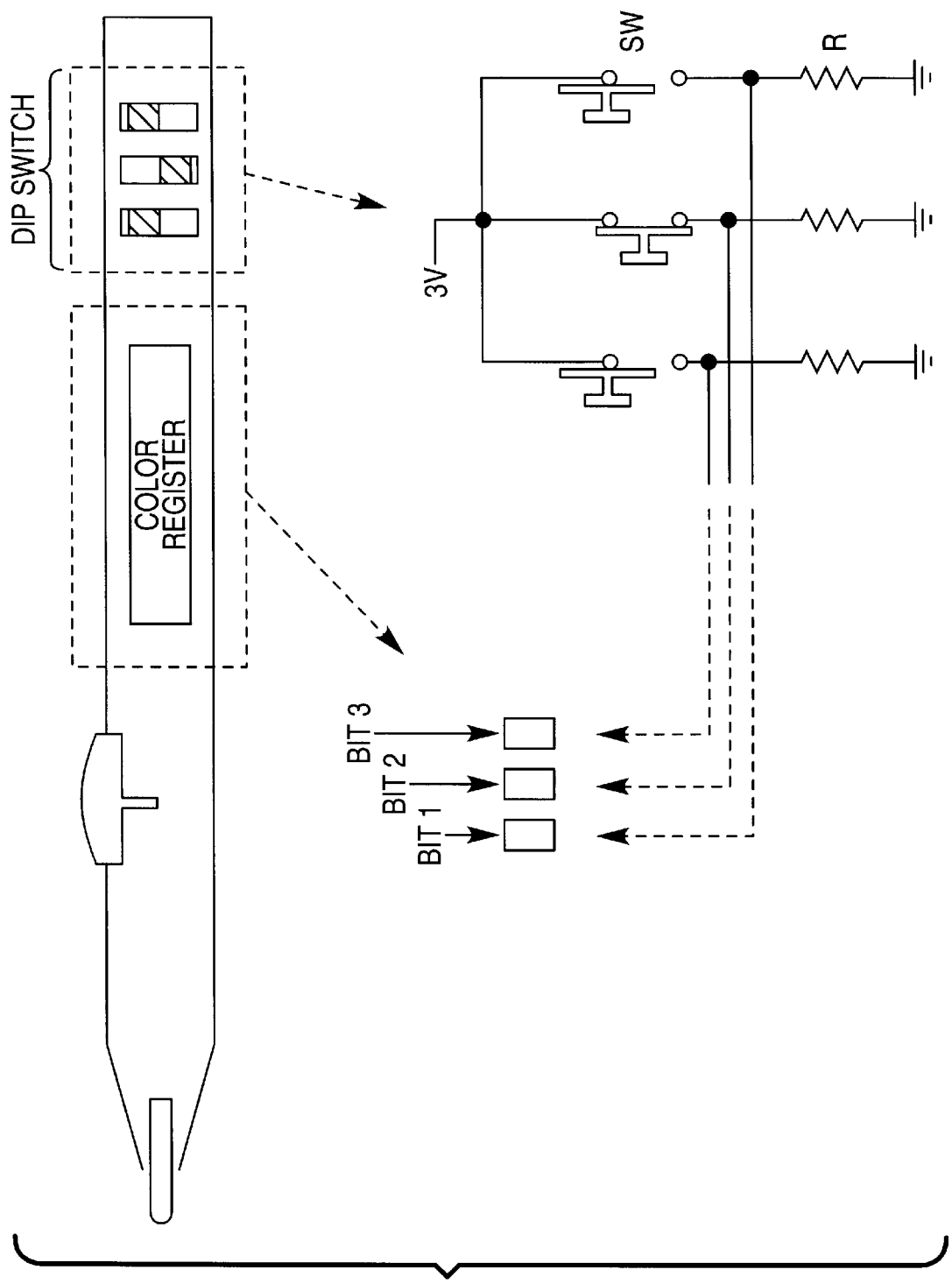
FIG. 9 illustrates a DIP switch which can be used to program memory within the stylus.

The color can be selectable by the user, through a user interface. For example, the COLOR REGISTER in FIG. 9 can actually take the form of a three-bit DIP switch, as shown. A user can program the register, and thus select a color, by setting the DIP switches. The three DIP switches behave as three registers.

Fault Codes

The OTHER DATA can include fault codes, which are generated during testing of the system. For example, a control system can test the components of the stylus, using known, prior-art procedures. When a component, such as a memory element or battery sensor, is found to operate incorrectly, the control system loads a fault code identifying the defect into one of the locations labeled OTHER DATA. The fault codes are given DATA IDENTIFIERS as in FIG. 8.

Important Considerations

1. The DIP switches act as programmable memory. The BARREL SWITCH and the TIP SWITCH shown in FIG. 2 do not act as such memory. That is, even though these switches produce default signals when they are not depressed, this characteristic is not considered equivalent to programmable memory.

Restated, the BARREL SWITCH in FIG. 3 has a normal output of ZERO. A user's intervention is required to produce an output of ONE. However, when the user ceases to press on the switch, the output returns to ZERO. The BARREL SWITCH is not programmable memory.

From another point of view, there is no information stored in the BARREL SWITCH, and, consequently, it does not act as memory. That is, if you know, in advance, that a user is not pressing on the BARREL SWITCH, you automatically know the output (ZERO). The BARREL SWITCH provides no additional information.

2. Some of the REGISTERs are pre-programmed, and their contents do not change during use. For example, those containing the serial number and owner's name do not change as to contents.

The contents of some other REGISTERs can, however, change. For example, those containing switch statuses, pressure transducer values, and battery condition will change during use.

Numerous substitutions and modifications can be undertaken without departing from the true spirit and scope of the invention. What is desired to be secured by Letters Patent is the invention as defined in the following claims.

We claim:

1. In a stylus for use with a computer, the improvement comprising:
    a) memory which stores data;
    b) a conversion circuit for converting the stored data into a serial bit stream; and
    c) a tip for outputting the stream; and
    d) a programmable interface for providing some of the data.

2. In a stylus for use with a computer, the improvement comprising:
    a) memory for storing data; and
    b) a programmable interface for allowing a user to program the memory.

3. Apparatus according to claim 1, in which the memory contains a multi-bit word indicating pressure applied to the tip of the stylus.

4. Apparatus according to claim 1, in which the memory contains a multi-bit word indicating barrel switch closure.

5. Apparatus according to claim 1, in which the memory contains a multi-bit word indicating battery condition.

6. Apparatus according to claim 1
    c) which further comprises memory whose contents changes during use, and
    d) in which the conversion, circuit converts said contents to a serial bit stream.

7. In a stylus for use with a computer, the improvement comprising:
    a) memory for storing data;
    b) a programmable interface coupled to the memory; and
    c) packetizing logic for
        i) producing a sequence of serial data packets, each including
            A) data from the memory and
            B) an identifier for the data.

8. Apparatus according to claim 7 in which the packetizing logic inserts a packet demarcation code between each packet.

9. A method of operating a stylus, comprising the following steps:
    a) storing pieces of data indicative of two or more of the following:
        i) an identification number,
        ii) a color,
        iii) battery status, and
        iv) pressure transducer output;
    b) for each piece of data, generating a packet pair, comprising
        i) serial data representing the piece of data, and
        ii) an identification packet; and
    c) applying the packet pairs as a continuous data stream, separated by a packet demarcation code, to a tip of the stylus.

10. Apparatus according to claim 1, in which the data includes data that changes during use of the stylus and data that does not change during use of the stylus.

11. A method of using a computer stylus comprising the steps of:
    storing information in the stylus some of the information is provided by a programmable interface;
    serially transmitting the information by amplitude-modulating a sine wave train; and
    applying the wave train to a tip of the stylus.

12. The method of claim 11 wherein the tip is capacitively coupled to a display.

13. The method of claim 11 wherein the information includes other data that includes at least one of the group consisting of owner name, serial number, stylus color and fault codes.

14. The stylus of claim 1 wherein the tip includes a tip switch.

15. The stylus of claim 1 wherein the tip includes a pressure transducer.

16. The stylus of claim 1 wherein the memory is pre-programmed.

17. The stylus of claim 1 wherein the conversion circuit includes a parallel-to-serial converter and a pulse train generator.

18. The stylus of claim 2 wherein the interface includes DIP switches.

* * * * *